(12) United States Patent
Hayes

(10) Patent No.: US 6,888,982 B2
(45) Date of Patent: May 3, 2005

(54) RECURSIVE OPTICAL DELAY LINE FILTER WITH NEUTRALIZATION

(75) Inventor: Robert R. Hayes, Calabasas, CA (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

(21) Appl. No.: 10/714,267

(22) Filed: Nov. 14, 2003

(65) Prior Publication Data

US 2004/0120642 A1 Jun. 24, 2004

Related U.S. Application Data

(60) Provisional application No. 60/434,705, filed on Dec. 18, 2002.

(51) Int. Cl.[7] .............................. G02B 6/26; H04J 14/02
(52) U.S. Cl. .............................. 385/32; 385/31; 385/39; 385/42; 385/88; 398/53; 398/82; 398/85; 398/102
(58) Field of Search .............................. 385/32, 31, 12, 385/88, 89, 92, 39, 42; 398/53, 82, 85, 102

(56) References Cited

U.S. PATENT DOCUMENTS

| | | | | |
|---|---|---|---|---|
| 4,128,758 A | * | 12/1978 | Bukowski et al. | 705/400 |
| 4,136,929 A | | 1/1979 | Suzaki | 350/96.15 |
| 4,558,920 A | | 12/1985 | Newton et al. | 350/96.15 |
| 4,934,777 A | | 6/1990 | Jou et al. | 350/96.15 |
| 4,976,518 A | * | 12/1990 | Burns | 385/27 |
| 4,997,249 A | * | 3/1991 | Berry et al. | 385/27 |
| 5,376,786 A | * | 12/1994 | MacDonald | 250/227.12 |
| 2004/0120642 A1 | * | 6/2004 | Hayes | 385/32 |

OTHER PUBLICATIONS

Jackson, L., et al., "Optical Fiber Delay–Line Signal Processing," *IEEE Transactions on Microwave Theory and Techniques*, vol. MTT–33, No. 3, pp. 193–210 (Mar. 1985).

Sales, S., et al., "Experimental Demonstration of Fibre–Optic Delay Line Filters With Negative Coefficients," *Electronics Letters*, vol. 31, No. 13, pp. 1095–1096 (Jun. 22, 1995).

Capman, J., Cascon, J., Martin, J.L., Sales, S., Pastor, D., and Marti, J., "Synthesis of Fiber–Optic Delay Line Filters," *Journal of Lightwave Technology*, vol. 13, pp. 2003–2012 (1995).

* cited by examiner

*Primary Examiner*—Brian M. Healy
(74) *Attorney, Agent, or Firm*—Ladas & Parry LLP

(57) ABSTRACT

A method and apparatus for generating a series of positive and negative signals from an optical signal. The optical signal is fed into a loop of optical fiber. The loop of optical fiber is provided with a first and second directional coupler. As the optical signal circulates through the optical loop, the first and second directional coupler extract a percentage of light from the optical signal, and couple the extracted light to a photodetector which converts the extracted light into electrical energy. The present invention also provides an impulse cancellation line. The impulse cancellation line is provided to neutralize the problematic initial light extracted from the optical signal in the first directional coupler and coupled to the photodetector. However, as the optical signal continues to circulate through the optical loop, the extracted light is not neutralized.

29 Claims, 5 Drawing Sheets

RECURSIVE OPTICAL DELAY LINE FILTER WITH NEUTRALIZATION

CROSS REFERENCE TO RELATED APPLICATION

The present application is related to and claims the benefit of U.S. Provisional Application No. 60/434,705, filed Dec. 18, 2002, and entitled "Recursive Optical Delay Line Filter with Neutralization." The disclosure of U.S. Provisional Application No. 60/434,705 is incorporated herein by reference in its entirety.

BACKGROUND

1. Field

The present invention relates to a delay filter. More specifically, the present invention relates to a bipolar optical delay line filter.

2. Description of Related Art

Fiber optic delay line filters are devices that can be used for RF or microwave signal processing. The filters can be configured to perform bandpass, band-stop, apodizing, comb-selection and a variety of other filtering functions heretofore performed by conventional microwave filters.

Fiber optic delay line filters have many properties that make them attractive for high-frequency applications. The optical fibers that are used to generate the delay have negligible dispersion, almost no loss, and occupy a relatively small volume, even when the individual fibers are long. By comparison, microwave lumped-element and tapped delay line filters are lossy, have considerable dispersion, and can be quite bulky and expensive to build at the higher microwave frequencies where waveguides must be used.

A typical fiber optic delay line filter consists of a length of optical fiber, with equally-spaced signal taps distributed along its length. The signal taps are used to remove a percentage of light that propagates through the filter. The small amount of light that is removed at each tap is combined with the light extracted from other signal taps and fed into a photodetector. This photodetector converts the light into an electrical current.

The intensity of the light entering the fiber optic delay line filter is amplitude-modulated by a microwave signal. Thus, the resultant electrical current at the photodetector will be equivalent to the amplitude of the sum of a number of microwave signals, each delayed by an amount $n\tau$, where n is the tap number and $\tau$ is the delay time (the time of propagation) between taps. If the tap strengths and delay lengths are chosen correctly, one can realize a number of different filter configurations.

The filter versatility, however, is limited by the fact that the current generated at the photodetector will always flow in one direction. Using this configuration, one cannot generate bipolar (plus and minus) signals. This is a severe restriction that limits the type of filter that can be built to a filter having a bandpass maximum at zero frequency.

To overcome this, the bipolar optical delay line filter 10 shown in FIG. 1 has been used. Such a bipolar filter is discussed in Jose Capman, Joaquin Cascon, Jose Luis Martin, Salvador Sales, Daniel Pastor, and Javier Marti, "Synthesis of Fiber-Optic Delay Line Filters," Journal of Lightwave Technology, Vol. 13, pp. 2003–2012 (1995).

The filter 10 consists of an optical splitter 12 for receiving and splitting an optical signal, a plurality of tap elements 14 to extract light from the optical signal, a summer 18 for combining the extracted light, a photodetector, comprised of a first and second photodiode 20, 22, and an amplifier 24.

The optical signal enters the optical splitter 12 where the optical signal is split into halves, thereby generating a first optical signal and second optical signal. The first optical signal is coupled into a first delay line 13 and proceeds to the upper set 3 of tap elements 14 and optical delay loops 16. The second optical signal is coupled into a second delay line 15 and proceeds to the lower set 5 of tap elements 14 and optical delay loops 16. The first and second optical signals proceed through the tap elements 14, which extract a percentage of light from the first and second optical signals. The light extracted by each tap element 14 from the first optical signal is received by the summer 18 and used to illuminate the first photodiode 20. The light extracted by each tap element 14 from the second optical signal is received by the summer 19 and used to illuminate the second photodiode 22. The first and second photodiodes 20, 22 convert the extracted light into an electrical current.

The electrical current from the first and second photodiodes 20, 22 is coupled to an amplifier 24 to generate an electrical signal that is proportional to the algebraic difference of the first and second optical signals received by summers 18, 19. When the amplifier 24 is connected to an oscilloscope or a similar device, the electrical current can be viewed. Because the first and second photodiodes 20, 22 are used in a push-pull configuration, current can be either injected into or drawn from the amplifier 24. The electrical current that results from the tap elements 14 in the lower set 5 will appear as a negative signal while the electrical energy that results from the tap elements 14 in the upper set 3 will appear as a positive signal. Thus, the first and second optical signals, though both initially positive, generate positive and negative electrical signals as they proceed through the filter 10.

The filter 10 shown in FIG. 1 also contains several optical delay loops 16 consisting of optical fiber. As the first and second optical signals proceed through the tap elements 14, they travel through the optical loops 16. The optical delay loops 16 delay the time it takes for the first and second optical signals to travel between the tap elements 14. The delay time between tap elements 14 in the upper set 3 sets the spacing between the positive signals, while the delay time between elements 14 in the lower set 5 sets the spacing between the negative signals. In this way, adjusting the amount of fiber in the optical delay loops 16 can be used to adjust the spacing between the positive or negative signals.

Additionally, the second delay line 15 contains an extra optical delay loop 17 adjacent to the optical splitter 12. The purpose of this optical loop 17 is to prevent the positive and negative signals from occurring at the same time in the time domain.

The problem with this type of bipolar optical delay line filter 10 is that numerous tap elements 14 and optical delay loops 16 are needed to extract light and to set the delay time between subsequent positive and negative signals. Generally speaking, the more complex the desired response from the extracted light, the greater the number of tap elements 14 needed to extract light from the optical signal. Furthermore, a perfect replication of any filter requires, in theory, an infinite number of tap elements to extract light. As shown in FIG. 1, there are five tap elements 14 in the upper set 3 and lower set 5. This would result in five positive signals, and five negative signals. A filter with only five tap elements 14 in each of the upper set 3 and lower set 5 would not handle a complex response as well as a filter having an infinite number of tap elements. However, increasing the number of tap elements 14 in the filter 10 would increase the size, weight, complexity, and cost of the filter.

For a certain limited class of filters, this problem can be addressed by using a recursive delay line. A recursive delay line is a loop of fiber with a single tap element. An optical signal is injected into the recursive delay line and passes through a tap element. Each time the optical signal passes through the tap element, a small percentage of light is extracted and coupled to a photodetector. The remaining light stays in the loop and makes another trip, after which the tap element extracts more light. This process is repeated, ad infinitum, until the light remaining in the fiber asymptotically approaches zero. However, this recursive delay line can only produce unipolar pulses. To get a bipolar response, one would need two recursive loops, which increases the size, cost, and complexity of the filter. Such a technique is also discussed in Jose Capman, Joaquin Cascon, Jose Luis Martin, Salvador Sales, Daniel Pastor, and Javier Marti, "Synthesis of Fiber-Optic Delay Line Filters," Journal of Lightwave Technology, Vol. 13, pp. 2003–2012 (1995).

SUMMARY

The present invention according to a preferred embodiment addresses the aforementioned problem by providing a bipolar optical delay line filter, which is simple to manufacture and small in size. The bipolar filter according to the present invention comprises an optical splitter. The optical splitter receives an optical signal and splits the optical signal into a first and second optical signal. The present invention also comprises an optical loop provided with two equally spaced directional couplers. The first optical signal is received by a first directional coupler, via optical fiber. A percentage of the light from the first optical signal is extracted and coupled to a first photodiode, while the remaining light in the first optical signal is injected into the optical loop. The first photodiode converts the extracted light into a series of positive signals. A second directional coupler located halfway around the optical loop receives the remaining light in the first optical signal, extracts a percentage of the light, and optically couples the extracted light to a second photodiode. The second photodiode converts the extracted light into a series of negative signals. The remaining light in the first optical signal returns to the first directional coupler where a percentage of the remaining light is again extracted and coupled to the first photodiode. In this way, the first optical signal continuously circulates through the optical loop between the first and second directional couplers ad infinitum, until the light from the first optical signal in the optical loop asymptotically approaches zero, thereby generating an infinite number of positive and negative signals.

The present invention also comprises an impulse cancellation line. The impulse cancellation line couples the second optical signal via optical fiber to the second photodiode. The second optical signal is time delayed so that it reaches the second photodiode at the same time the light initially extracted from the first optical signal in the first directional coupler reaches the first photodiode. The ratio of the signal strength between the first and second optical signals is adjusted at the optical splitter, so that the second optical signal has an amplitude equal to the amplitude of the light initially extracted and received at the first photodiode. As a result, the initial light extracted and received at the first photodiode from the first directional coupler is neutralized or canceled out by the second optical signal. However, the second optical signal is only used to remove the initial light extracted from the first optical signal by the first directional coupler. As the first optical signal continues to circulate in the optical loop, the second optical signal does not neutralize any extracted light.

DETAILED DESCRIPTION

The present invention will now be described more fully hereinafter with reference to the accompanying drawings, in which preferred embodiments of the invention are shown. This invention may be embodied in many different forms and should not be construed as limited to the embodiments set forth herein.

The present invention will now be described according to a preferred embodiment with reference to FIGS. 2–5. An optical delay line filter 100 according to the present invention is shown schematically in FIG. 2. The filter 100 comprises an optical splitter 101 having an input indicated generally at 102, a first output indicated generally at 103, and a second output indicated generally at 105. An optical signal consisting of an intensity-modulated lightwave enters the input 102 and is split unequally between first and second outputs 103 and 105, thereby generating a first optical signal and a second optical signal. The modulation can be that of any type of discrete or continuous signal. The unequal split between the first and second optical signals will be discussed later. In addition, the source (not shown) generating the first and second optical signals has a coherence length that is less than the length of the individual delay elements (discussed later). This helps avoid beating effects at the photodetector (discussed later).

Figure 1:
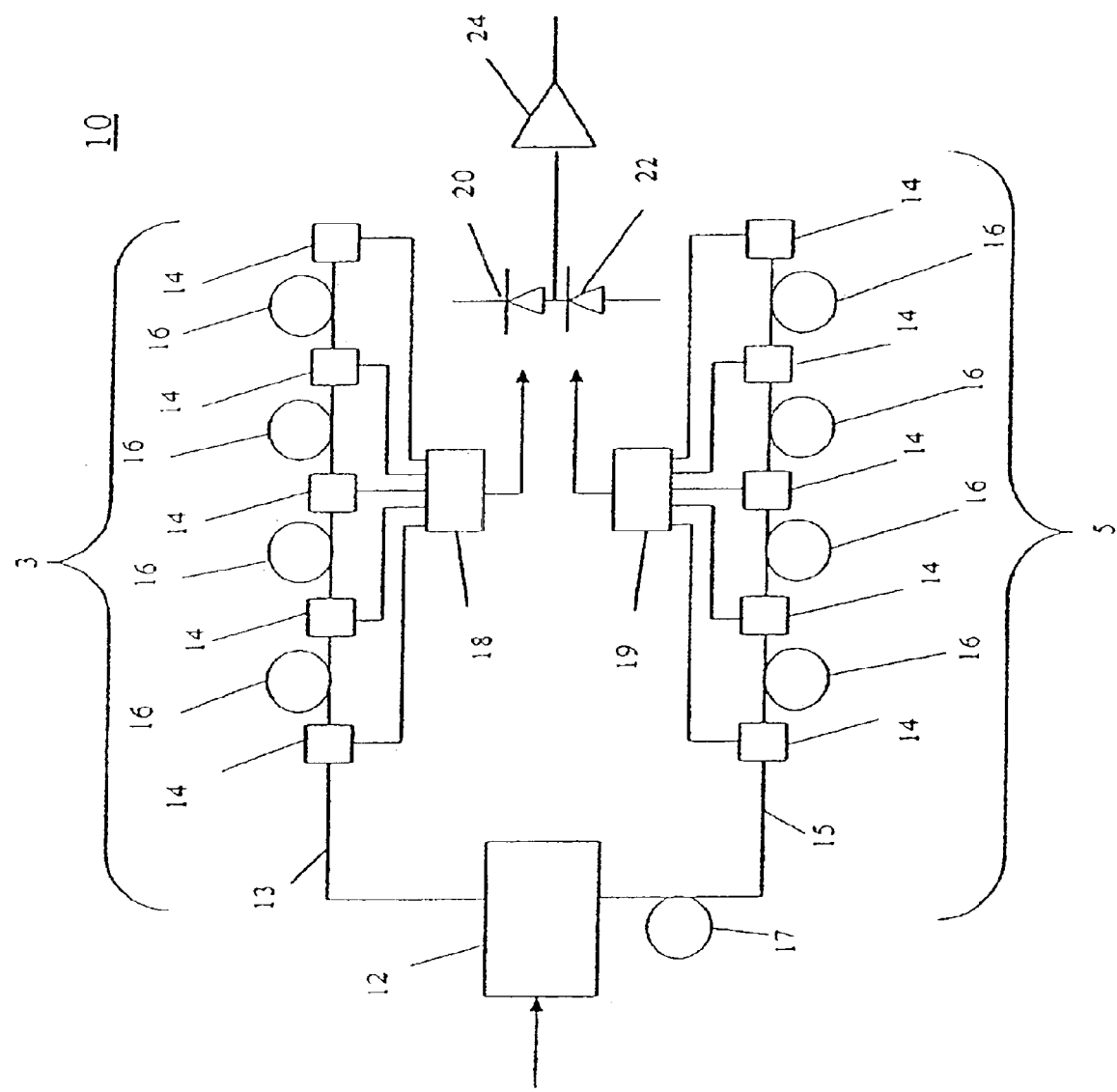
FIG. 1 shows the prior art optical delay line filter approach.
Figure 2:
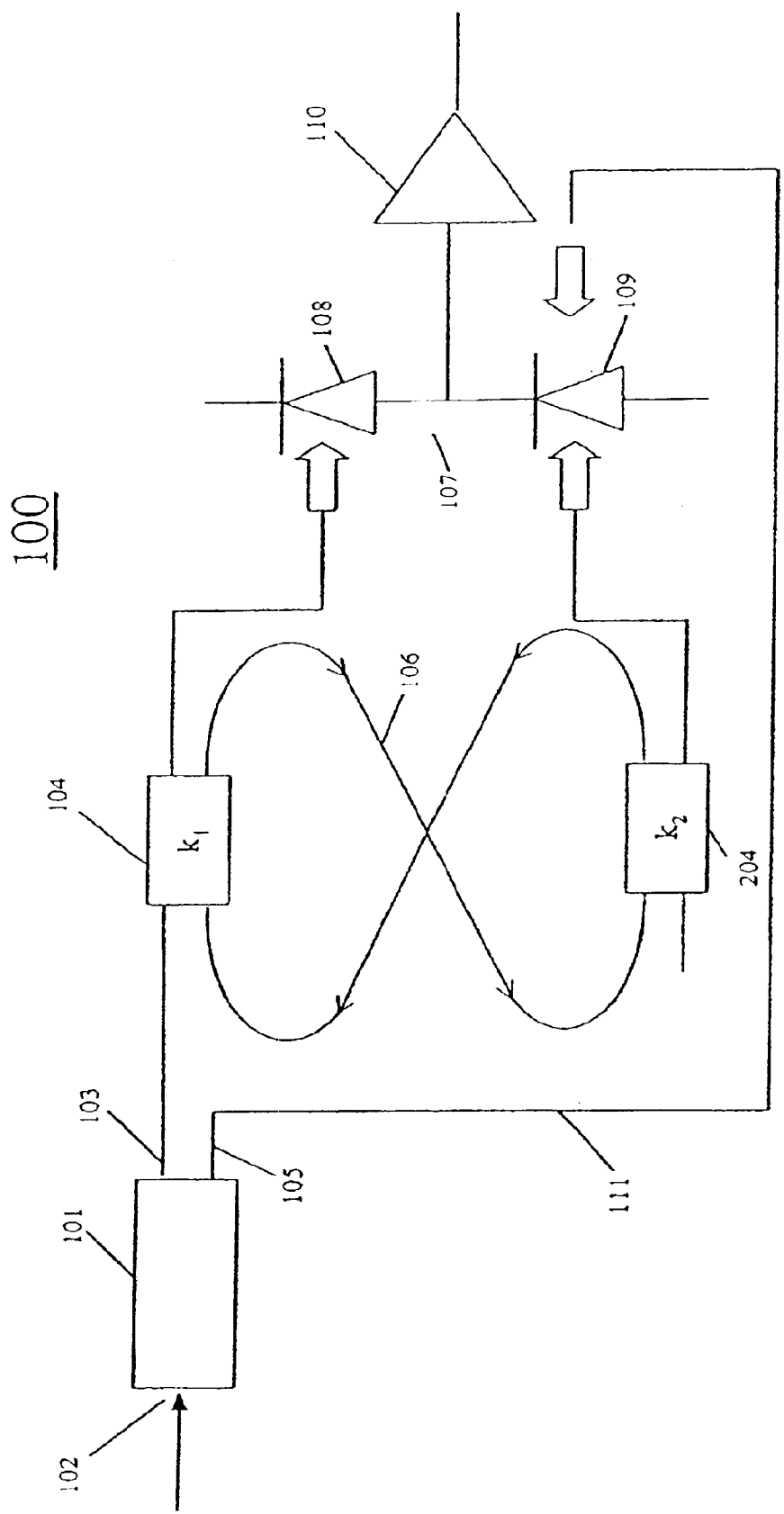
FIG. 2 shows the bipolar optical delay line filter according to the present invention.
Figure 3:
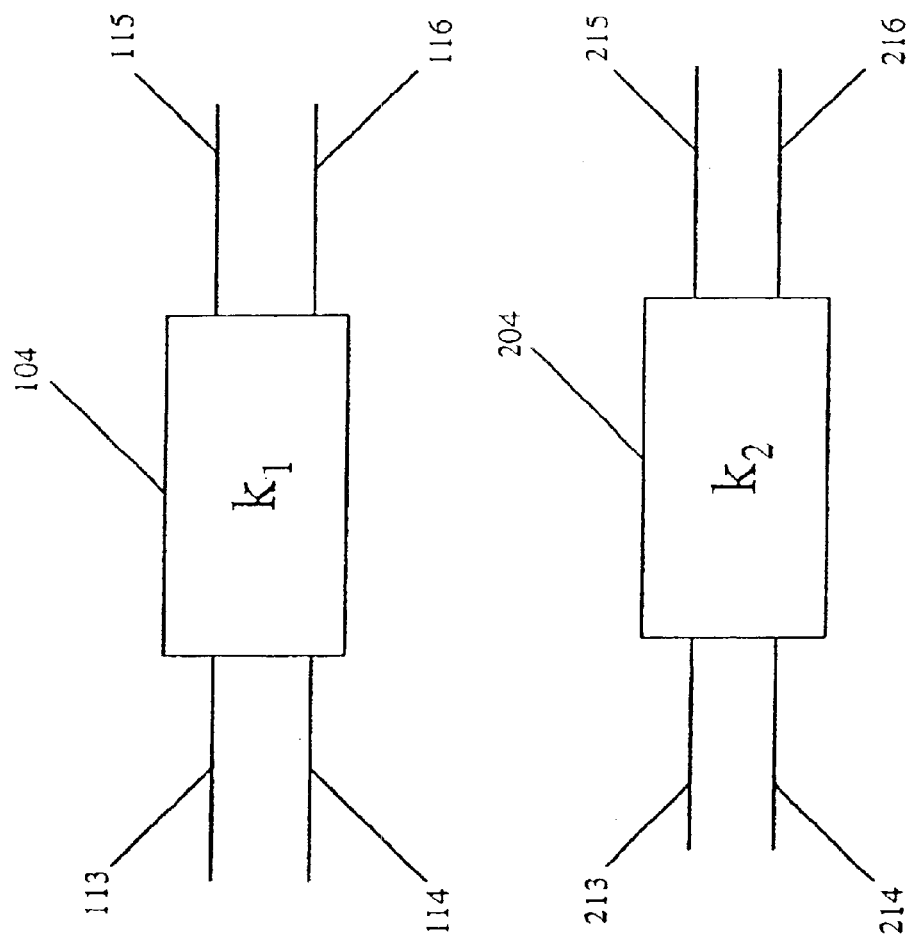
FIG. 3 shows the first and second directional coupler according to the present invention.

The filter 100 also comprises an optical loop 106, preferably comprising optical fiber, provided with a first and second directional coupler 104, 204. The optical loop 106 can be of a circular shape or it may be of a FIG.-8 configuration as shown in FIG. 2, or such other shape as will accommodate a first and second directional coupler. The first optical signal is coupled from the first output 103 of the optical splitter 101 to first input port 113 (See FIG. 3) of the first directional coupler 104 via optical fiber. While in the first directional coupler 104 a percentage of light is extracted from the first optical signal at first output port 115 and coupled to a first photodiode 108 in a dual-balanced photodetector 107. The amount of light extracted from the first optical signal is determined by the coupling coefficient ($k_1$) of the first directional coupler 104. For the directional coupler 104 shown in FIG. 2, increasing the coupling coefficient ($k_1$) will couple more light into the optical loop 106, while decreasing the coupling coefficient ($k_1$) will direct more light to the first photodiode 108. Those skilled in the art will realize that adjusting the coupling coefficient of a directional coupler is well known.

The remaining portion of the first optical signal enters the optical loop 106 through second output port 116 (See FIG. 3) and proceeds to enter the second directional coupler 204 through first input port 213. While in the second directional coupler 204 a percentage of light is extracted from the remaining portion of the first optical signal at second output port 216 and coupled to a second photodiode 109 in the dual-balanced photodetector 107. As shown in FIG. 2, the anode of the first photodiode 108 is serially connected to the cathode of the second photodiode 109. The first and second photodiodes 108, 109 convert the extracted light into an electrical current, which is received by the amplifier 110. The amplifier 110 can then be connected to a spectrum analyzer or similar device where the electrical current can be viewed. Also, those skilled in the art will realize that any configuration in which the first and second photodiodes 108, 109 are connected so as to generate an electrical signal that is proportional to the algebraic difference of the light extracted in the first and second directional couplers 104, 204 would work equally as well.

The amount of light extracted from the first optical signal in the second directional coupler 204 is determined by the coupling coefficient ($k_2$). For the second directional coupler 204 shown in FIG. 2, decreasing the coupling coefficient ($k_2$) will couple more light into the optical loop 106, while increasing the coupling coefficient ($k_2$) will direct more light to the second photodiode 109. Those skilled in the art will realize that adjusting the coupling coefficient of the directional coupler is well known. The remaining light in the first optical signal is coupled into the optical loop 106 through first output port 215 (See FIG. 3). The first optical signal then continues to circulate through the optical loop 106, and first and second directional couplers 104, 204, where a percentage of light is extracted each time the optical signal passes through the first and second directional couplers 104, 204. Those skilled in the art will realize that adjusting the coupling coefficient of the directional coupler is well known.

The optical delay line filter 100 also comprises an impulse cancellation line 111 as shown in FIG. 2. The impulse cancellation line 111 is connected between the second output 105 of the optical splitter 101 and the second photodiode 109. For the desired filtering characteristics to be obtained, the initial light extracted and coupled to the first photodiode 108 should be removed. The impulse cancellation line 111 couples the second optical signal, which is time delayed, to the second photodiode 109 so that it reaches the second photodiode 109 at the same time the initial light extracted from the first optical signal in the first directional coupler 104 reaches the first photodiode 108. Also, the amplitudes of the first and second optical signals are adjusted in the optical splitter 101 so the amplitude of the initial light extracted from the first optical signal in the first directional coupler 104 is the same as the second optical signal. Adjusting the amplitudes of the first and second optical signals in the optical splitter 101 is well known. Because of the high common mode rejection ratio associated with the interconnected first and second photodiodes 108, 109, the second optical signal on the impulse cancellation line 111 will neutralize the initial light extracted and received at the first photodiode 108. It is important to note that only the initial light extracted from the first directional coupler 104 is neutralized. As the first optical signal continues to circulate through the optical loop 106 ad infinitum, the light extracted at the first and second directional couplers 104, 204 and coupled to the first and second photodiodes 108, 109 is not neutralized.

Figure 4:
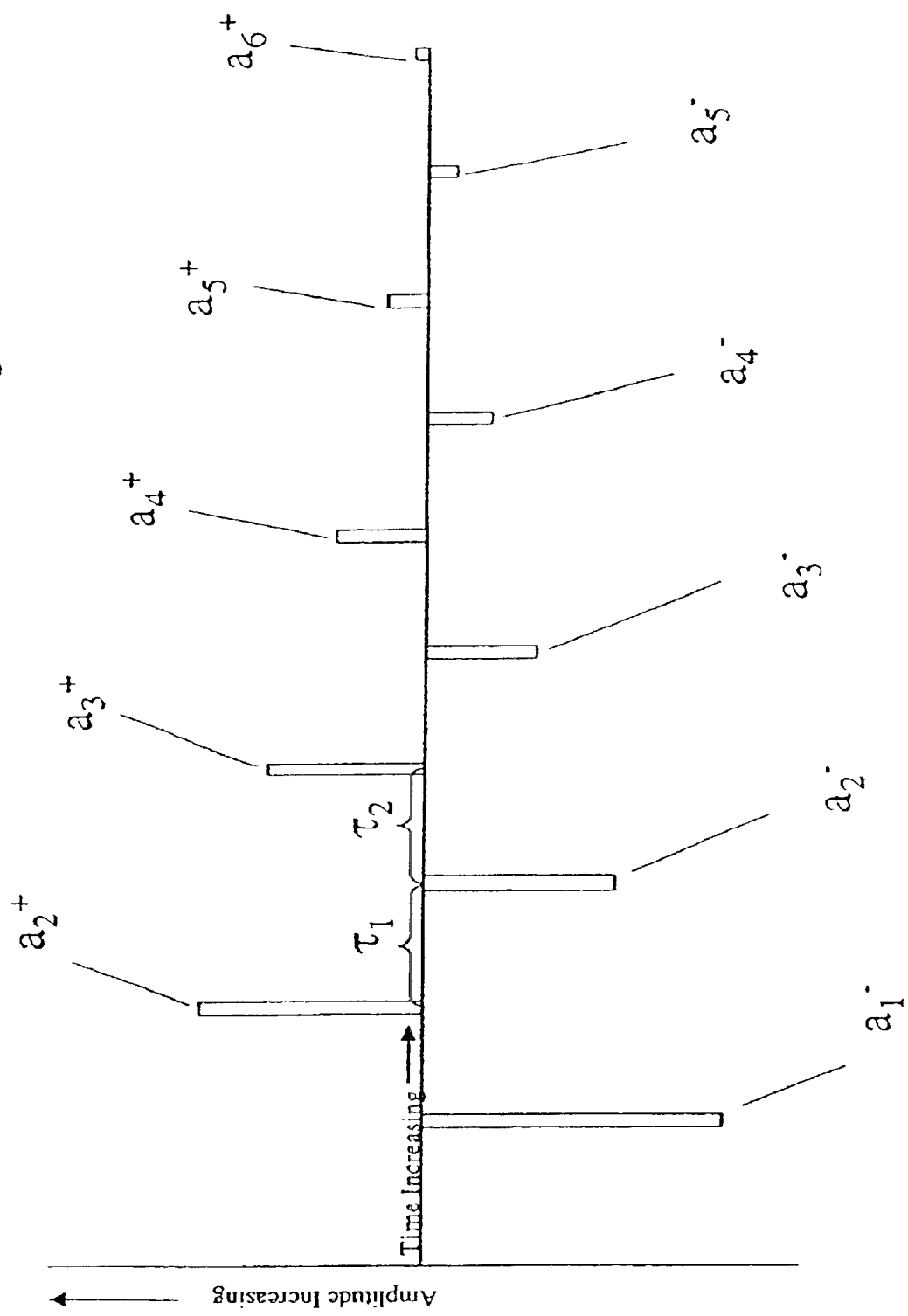
FIG. 4 shows an exemplary output of the present invention in the time domain.

Shown in FIG. 4 is an exemplary time domain diagram of the extracted light from the first optical signal, when the optical signal inputted to the optical splitter 101 is a delta-function impulse. Of course, as discussed above, the filter of the present invention is applicable to any continuous or discrete modulation signal. However, the response of a filter can be determined for all frequencies if one knows the response to a delta-function impulse. This greatly simplifies the analysis of bipolar delay line filters. Also, as will be seen, taking the Fourier transform of the time domain response shown in FIG. 4 will result in the frequency response of the filter.

The pulses denoted as $a_n^+$ in FIG. 4 are the positive pulses received by the first photodiode 108. The value of n corresponds to when the light is extracted. For example, n=2 corresponds to the light that was extracted when the delta-function impulse went through the first directional coupler 104 the second time, n=3 corresponds to the light that was extracted when the delta-function impulse went through the first directional coupler 104 the third time, etc. The pulses denoted as $a_n^-$ are the negative pulses received by the second photodiode 109. The value of n corresponds to when the light is extracted. For example, n=1 corresponds to the light that was extracted when the delta-function impulse went through the second directional coupler 204 the first time, n=2 corresponds to the light that was extracted when the delta-function impulse went through the second directional coupler 204 the second time, etc. It is worth noting that for the positive pulses received by the first photodiode 108, there is no positive pulse corresponding to n=1. This is a result of the impulse cancellation line 111 providing a second optical signal which is used to neutralize the initial light extracted from the first optical signal in the first directional coupler 104. The energy of a given positive or negative pulse for a given value of n can be found by the following recursive relationships shown in equations 1 and 2.

$$a_n^+ = (k_1)^2 \times (1-k_1)^{n-2} \times (1-k_2)^{n-1}, \text{ for } n \geq 2 \quad (1)$$

$$a_n^- = k_1 k_2 (1-k_1)^{n-1} \times (1-k_2)^{n-1}, \text{ for } n \geq 1 \quad (2)$$

The energy of the very first pulse, $a_1^+$, to reach the first photodiode 108 is given by equation 3:

$$a_1^+ = (\text{Initial Energy of First Optical Signal}) \times (1-k_1) \quad (3)$$

The energy of the second optical signal should thus be adjusted to this value in order to neutralize $a_1^+$.

Furthermore, as shown in FIG. 4, the delay time between subsequent positive pulses and negative pulses is denoted as $\tau_1$ and $\tau_2$, respectively. The value of $\tau_1$ is determined by the time it takes the delta-function impulse to travel from the center of the first directional coupler 104 to the center of the second directional coupler 204. The value of $\tau_2$ is determined by the time it takes the delta-function impulse to travel from the center of the second directional coupler 204 to the center of the first directional coupler 104. The output shown in FIG. 4 has $\tau_1$ and $\tau_2$ equal to each other; however, those skilled in the art will realize that changing $\tau_1$ and $\tau_2$ will produce different outputs. In this way $\tau_1$ and $\tau_2$ can be easily adjusted by increasing or decreasing the amount of optical fiber in the optical loop 106 that couple the first and second directional couplers 104, 204 together.

As discussed above, taking the Fourier transform of the time domain output that results from a delta-function impulse at the input produces the frequency response of the filter. Equation 4 shows the frequency response for a filter in which the coupling coefficients, $k_1$ and $k_2$, of the first and second directional coupler 104, 204 are equal, and the time delays $\tau_1$ and $\tau_2$ are equal. Those skilled in the art will realize that other combinations of delay lengths and coupling coefficients will lead to different responses.

$$F(f) = \frac{-(1-k)k^2 \exp[j2\pi f\tau]}{(1+(1-k)\exp[j2\pi f\tau])(2-k)} \quad (4)$$

$\tau=\tau_1=\tau_2$
$k=k_1=k_2$
$f=1/\tau$

Figure 5:
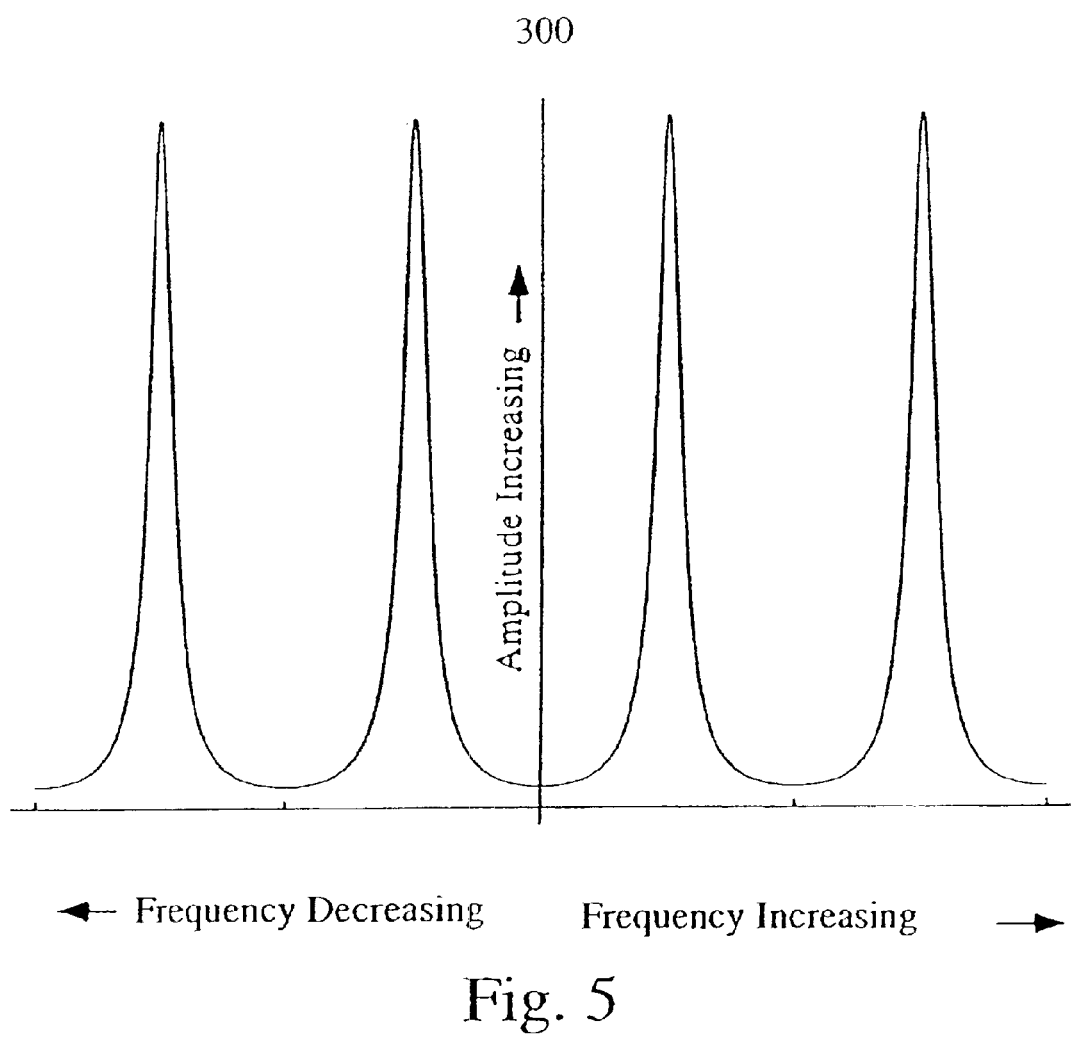
FIG. 5 shows an exemplary output of the present invention in the frequency domain.

Shown in FIG. 5 is the frequency response 300 of the filter according to the time domain output shown in FIG. 4, using equation 4 and k=0.3. As shown in FIG. 5, the peaks are shifted away from zero, which is an important feature of bipolar filters.

Let it be understood that the foregoing description is only illustrative of the invention. Various alternatives and modifications can be devised by those skilled in the art without departing from the spirit of the invention. Accordingly, the present invention is intended to embrace all such alternatives, modifications, and variances which fall within the scope of the appended claims.

What is claimed is:

1. An optical delay line filter comprising:
   an optical splitter;
   an optical loop having a first directional coupler and a second directional coupler, wherein the first directional coupler is in communication with the optical splitter and the second directional coupler;
   a photodetector in communication with the first and second directional couplers; and
   an impulse cancellation line coupled between the optical splitter and the photodetector.

2. The filter of claim 1, wherein the optical loop comprises optical fiber.

3. The filter of claim 1, wherein the photodetector comprises a first and second photodiode.

4. The filter of claim 3, further comprising an amplifier connected to the photodetector.

5. The filter of claim 3, wherein the impulse cancellation line is coupled between the optical splitter and the second photodiode.

6. The filter of claim 3, wherein the first photodiode is in communication with the first directional coupler, and the second photodiode is in communication with the second directional coupler.

7. An optical delay line filter comprising:
   an optical loop provided with a first and second directional coupler, wherein a first optical signal circulates through the optical loop between a first directional coupler and a second directional coupler, and wherein each of the first and second directional couplers extract a percentage of light from the first optical signal each time the first optical signal passes through each of the first and second directional couplers, thereby generating a series of positive and negative signals;
   a photodetector, the photodetector receiving the extracted light from the first and second directional couplers; and
   an impulse cancellation line, the impulse cancellation line providing a second optical signal to the photodetector, the second optical signal canceling a first positive signal in the series of positive signals.

8. The filter of claim 7, wherein the optical loop comprises optical fiber.

9. The filter of claim 7, further comprising an amplifier coupled to the photodetector.

10. The filter of claim 9, wherein the photodetector comprises a first photodiode and second photodiode, the first and second photodiode connected so as to produce an electrical signal that is proportional to the algebraic difference of the extracted light from the first and second directional couplers.

11. The filter of claim 7, wherein the second optical signal and first positive signal reach the photodetector simultaneously, and wherein the amplitude of the second optical signal is equal to the amplitude of the first positive signal.

12. The filter of claim 7, wherein the first directional coupler has a coupling coefficient, the coupling coefficient of the first directional coupler being adjustable to adjust the percentage of light extracted from the optical signal in the first directional coupler.

13. The filter of claim 7, wherein the second directional coupler has a coupling coefficient, the coupling coefficient of the second directional coupler being adjustable to adjust the percentage of light extracted from the optical signal in the second directional coupler.

14. The filter of claim 7, further comprising a time delay determined by the spacing between the first and second directional couplers in the optical loop, said spacing being adjustable to adjust the time delay between positive signals in the series of positive and negative signals, and to adjust the time delay between negative signals in the series of negative signals.

15. The filter of claim 10, wherein the impulse cancellation line is in communication with the second photodiode.

16. A method for filtering an optical signal comprising the steps of:
   circulating the optical signal through a first and second directional coupler;
   extracting a percentage of light from the optical signal each time the optical signal passes through each of the first and second directional couplers, thereby generating a series of positive and negative signals; and
   canceling a first positive signal in the series of positive signals.

17. The method of claim 16, further comprising a photodetector for receiving the extracted light from the first and second directional couplers.

18. The method of claim 16, further comprising the step of adjusting a coupling coefficient of the first directional coupler, thereby adjusting the percentage of light extracted from the optical signal in the first directional coupler.

19. The method of claim 16, further comprising the step of adjusting a coupling coefficient of the second directional coupler, thereby adjusting the percentage of light extracted from the optical signal in the second directional coupler.

20. The method of claim 16, further comprising the step of adjusting the spacing between the first and second directional couplers, thereby adjusting the time delay between positive signals in the series of positive and negative signals and adjusting the time delay between negative signals in the series of positive and negative signals.

21. The method of claim 17, further comprising an amplifier coupled to the photodetector.

22. The method of claim 21, wherein the photodetector comprises a first photodiode and second photodiode, the first and second photodiode being connected so as to produce an electrical signal that is proportional to the algebraic difference of the extracted light from the first and second directional couplers.

23. An optical delay line filter comprising:
   an optical splitter receiving an optical signal and providing a first optical output and a second optical output;
   an optical loop having an optical path;

a first directional coupler having a first port, a second port, a third port, and a fourth port, the first port receiving the first optical output, the third port and the fourth port adapted to provide a portion of the optical path;

a second directional coupler having a first port, a second port, and a third port, the first port and the second port adapted to provide a portion of the optical path;

a photodetector in communication with the second port of the first directional coupler and the third port of the second directional coupler; and an impulse cancellation line coupling said second optical output to the photodetector.

24. The filter of claim 23, wherein said first directional coupler has a first coupling coefficient, the first coupling coefficient determining an amount of light coupled from the third port of the first directional coupler into the optical loop and wherein the second directional coupler has a second coupling coefficient determining an amount of light coupled from the optical loop to the third port of the first directional coupler.

25. The filter of claim 23, wherein said first directional coupler has a first coupling coefficient, the first coupling coefficient determining an amount of light coupled from the second port of the first directional coupler to the photodetector and the second directional coupler having a second coupling coefficient determining an amount of light coupled from the second output port to the photodetector.

26. The filter of claim 23, further comprising a time delay determined by the spacing between the first and second directional couplers in the optical loop.

27. The filter of claim 25, further comprising an amplifier coupled to the photodetector.

28. The filter of claim 27, wherein the photodetector comprises a first photodiode and second photodiode, the first and second photodiode being connected so as to produce an electrical signal that is proportional to the algebraic difference of the light coupled from the second port of the first direction coupler to the photodetector and the light coupled from the second output port of the second directional coupler to the photodetector.

29. The filter of claim 28, wherein the impulse cancellation line is in communication with the second photodiode.

* * * * *